United States Patent
O'Connor et al.

(10) Patent No.: US 7,325,050 B2
(45) Date of Patent: Jan. 29, 2008

(54) SYSTEM AND METHOD FOR STRATEGIC POWER REDUCTION IN A COMPUTER SYSTEM

(75) Inventors: Clint H. O'Connor, Austin, TX (US); Alfred C. Hartmann, Round Rock, TX (US)

(73) Assignee: Dell Products L.P., Round Rock, TX (US)

( * ) Notice: Subject to any disclaimer, the term of this patent is extended or adjusted under 35 U.S.C. 154(b) by 771 days.

(21) Appl. No.: 09/955,684

(22) Filed: Sep. 19, 2001

(65) Prior Publication Data

US 2003/0056126 A1    Mar. 20, 2003

(51) Int. Cl.
G06F 15/173    (2006.01)
G06F 1/32       (2006.01)

(52) U.S. Cl. ................................ 709/223; 713/320
(58) Field of Classification Search ............ 713/300, 713/320; 709/223
See application file for complete search history.

(56) References Cited

U.S. PATENT DOCUMENTS

| | | | |
|---|---|---|---|
| 4,228,496 A | 10/1980 | Katzman et al. | 364/200 |
| 4,495,568 A | 1/1985 | Gilbert et al. | 364/200 |
| 4,747,041 A | 5/1988 | Engel et al. | 364/200 |
| 4,851,987 A | 7/1989 | Day | 364/200 |
| 5,428,790 A | 6/1995 | Harper et al. | 395/750 |
| 5,563,455 A | 10/1996 | Cheng | 307/41 |
| 5,781,187 A | 7/1998 | Gephardt et al. | 395/308 |
| 5,784,268 A | 7/1998 | Steffek et al. | 363/55 |
| 5,784,628 A * | 7/1998 | Reneris | 713/300 |
| 5,787,293 A | 7/1998 | Kim et al. | 395/750.01 |
| 5,862,394 A | 1/1999 | Watts et al. | 395/750.07 |
| 5,918,061 A | 6/1999 | Nikjou | 395/750.06 |
| 5,926,404 A * | 7/1999 | Zeller et al. | 713/321 |
| 6,028,373 A | 2/2000 | Kim et al. | 307/31 |
| 6,092,207 A | 7/2000 | Kolinski et al. | 723/323 |
| 6,141,762 A | 10/2000 | Nicol et al. | 713/300 |

(Continued)

FOREIGN PATENT DOCUMENTS

JP    6231098    8/1994

(Continued)

OTHER PUBLICATIONS

MultiProcessor Specification, Intel. Version 1.4, May 1997.

(Continued)

*Primary Examiner*—Jason Cardone
*Assistant Examiner*—Tanim Hossain
(74) *Attorney, Agent, or Firm*—Baker Botts L.L.P.

(57) ABSTRACT

A system and method are provided for strategic power reduction in a computer system. The system and method includes a plurality of processing resources that process data. Associated with the processing resources are a plurality of power supplies that provide power for the processing resources. A resource management engine determines the demand on the computer system and scales the processing resources to conserve and reduce power consumption. The resource management engine brings online additional processing resources to meet additional demand or brings offline or to a lower power state processing resources to meet a decreased demand. In addition, the resource management engine predicts future demand requirements and adjusts the processing resources in advance to meet the predicted demand levels and allows for dynamic adjustment of the processing resources based on current demand events.

26 Claims, 3 Drawing Sheets

U.S. PATENT DOCUMENTS

| | | | |
|---|---|---|---|
| 6,583,521 B1 * | 6/2003 | Lagod et al. | 307/70 |
| 6,735,704 B1 * | 5/2004 | Butka et al. | 713/300 |
| 2002/0062454 A1 * | 5/2002 | Fung | 713/300 |
| 2003/0023885 A1 * | 1/2003 | Potter et al. | 713/300 |

FOREIGN PATENT DOCUMENTS

| | | |
|---|---|---|
| JP | 9319474 | 12/1997 |
| JP | 9319475 | 7/1998 |

OTHER PUBLICATIONS

Advanced Configuration and Power Interface Specification, Intel, Microsoft, Toshiba. Revision 1.0B, Feb. 2, 1999.

Advanced Configuration and Power Interface Specification, Compaq Computer Corporation, Intel Corporation, Microsoft Corporation, Phoenix Technologies Ltd., Toshiba Corporation. Revision 2.0, Jul. 27, 2000.

Advanced Configuration and Power Interface Specification Revision 2.0 Errata, Compaq Computer Corporation, Intel Corporation, Microsoft Corporation, Phoenix Technologies Ltd., Toshiba Corporation. Errata Document Revision 1.5, Apr. 13, 2001.

Japanese Abstract JP 6231098, Aug. 19, 1994.

Japanese Abstract JP 9319474, Dec. 12, 1997.

Japanese Abstract JP 9319475, Jul. 28, 1998.

U.S. Pending Patent Application entitled "A System and Method for Strategic Power Sequencing in a Computer System" filed by O'Connor et al., filed Sep. 19, 2001.

* cited by examiner

SYSTEM AND METHOD FOR STRATEGIC POWER REDUCTION IN A COMPUTER SYSTEM

TECHNICAL FIELD

This disclosure relates in general to the field of computer power consumption, and more particularly to a system and method for strategic power reduction in a computer system.

BACKGROUND

Computer systems, including servers and storage subsystems, use significant amounts of power. In the past, conserving power has always been secondary to speed and processor availability. However, Internet sites with excess capacity for high peak periods such as an Olympics website or an online stock trading website waste power keeping the computer systems ready for the next peak period. In addition, power problems and rolling blackouts, such as those experienced in California in 2000-2001 during deregulation, have begun to spur awareness that power conservation may be required in order to keep a network center operational. In addition, as microprocessors continue to scale up in speed and density, the microprocessor's power consumption will increase dramatically requiring more efficient power consumption.

Because of the increased processing demands required by today's software and Internet sites, more computer systems utilize multi-processor systems which require more power to operate than single processor computer systems. In multi-processor technology, multi-processor specifications describe how to start and stop processors in multi-processor servers. The multi-processor specifications select a boot processor and then add application processors as discovered, so that a multi-processor server is dynamically configured without a fixed foreknowledge of the number of processors in the server. But the multi-processor and the Advanced Configuration and Power Interface ("ACPI") specifications do not typically allow for any power consumption control or savings from a source or decision engine external to the server unit in which the multiple processors reside nor do the specifications typically provide for strategic control over the multiple power supplies.

With the advent of power hungry processors and multi-processor computer systems, power management has become more important. The focus was first on portable computer systems to reduce power consumption as a means of maximizing battery life. From portables, the technology was applied to desktops, primarily to reduce the long boot time wait by leaving the machine in standby, rather than doing a cold boot each time. Specifically, Advanced Configuration and Power Interface (ACPI) in the Windows operating system addresses inclusion of ACPI power states in computer systems and allows the operating system to control the amount of power given to each device attached to a computer. For example, ACPI allows the operating system to turn off peripheral devices, such as a DVD-ROM player or a monitor, when the peripheral device is not in use. However, ACPI is a control method that is exercised by the operating system and is geared towards controlling the operation of peripheral devices and not the multi-processors. In many cases, the operating system on any specific machine does not have sufficient information to make knowledgeable decisions regarding the best enterprise level power management strategy for a server or rack of servers containing single or multi-processors. This decision must often be made outside the scope of the operating system running on any individual server for maximum utility, and further, the decision may not be based on the demand requirement for a particular server or processor.

SUMMARY

Therefore, a need has arisen for a system and method that allows for enterprise level power management.

A further need has arisen for a system and method that allows for power reduction based upon the power demands and processing demands of the system.

A further need has arisen for a system and method that allows for strategies for power consumption and power reduction.

In accordance with the teachings of the present disclosure, a system and method are described for strategic power reduction in a computer system which substantially eliminates or reduces disadvantages and problems associated with previous systems and methods. The system and method allows for strategic enterprise level power management and power conservation based on the power and processing demands for multiple processing resources and multiple computer systems.

In accordance with one aspect of the present disclosure, a system and method provides strategic enterprise level power management for a computer system having a plurality of processing resources operable to process data. The computer system also includes a plurality of power supplies operable to provide power to the processing resources and redundancy features. A resource management engine, associated with the processing resources, preferably scales the number of processing resources operating in relation to the processing and power demands made on the computer system.

More specifically, the resource management engine detects the demand on the computer system. With the demand determined, the resource management engine decides if a processing resource change is needed to meet the current demand. If the demand decreases, the resource management engine may power down processing resources. A power down may be either completely turning off the processing resource or provide power to the processing resource at a lower power state. If demand increases, the resource management engine may power up additional processing resources necessary to handle the increased demand.

In an alternative embodiment of the present disclosure, the system and method allows for forecasting or predicting demand. The resource management engine stores historical data in a plurality of dynamic tables. The historical data includes information from other time periods regarding time of day, week, and year demands. By predicting demand, the resource management engine may scale the appropriate number of processing resources in advance to adequately satisfy future demand requirements when the computer system actually experiences the demand requirements.

The present disclosure provides a number of important technical advantages. One important technical advantage is the ability for enterprise level power management. Power management and power reduction may be handled across a single computer system or multiple computer systems. For example, the resource management engine can manage the power consumption across a plurality of racks of servers where each server is a multi-processor server. This provides for a strategic advantage in that multiple computer systems can be managed as one and enterprise level resource availability and power management can be achieved and managed intelligently.

Another important technical advantage of the present disclosure is that the power consumption and power reduction may be based on power and processing demands of the computer system and not loads on the computer system. Basing power consumption on demand and not load allows the computer system to more quickly and adequately respond to change and not have to wait until the processing resources are overburdened with load to make a change.

Another important technical advantage of the present disclosure is that it allows for strategies for optimizing power consumption and power reduction. The present disclosure goes beyond operating system control of multi-processor computer systems using ACPI or other power management methods to specifically address optimum power consumption and reduction as a goal or strategy. This is achieved by extending decisions beyond local processor architecture or multi-processor computer system architecture. This present disclosure allows local and global power management strategies to reduce power consumption and still maintain processing capacity across a single computer system or multiple computer systems. In addition, the ability to predict demand allows for additional strategies in reducing power consumption.

BRIEF DESCRIPTION OF THE DRAWINGS

A more complete understanding of the present embodiments and advantages thereof may be acquired by referring to the following description taken in conjunction with the accompanying drawings, in which like reference numbers indicate like features, and wherein.

DETAILED DESCRIPTION

Preferred embodiments and their advantages are best understood by reference to FIGS. 1 through 4, wherein like numbers are used to indicate like and corresponding parts.

Under previous systems and methods for power management and power reduction in computer systems, the power management has generally been locally bound for a single computer system based on load requirements and does not typically allow for power reduction and management at the enterprise level. The present disclosure allows power reduction and management across one or more computer systems based upon demands on the computer systems which allows leveraging of resources across multiple computer systems. The enterprise level power reduction and management allows for the development of a strategic power reduction and management plan, predicting demand values and adjusting in advance computer systems to efficiently meet predicted demand, and intelligently managing and using processing resources.

Figure 1:
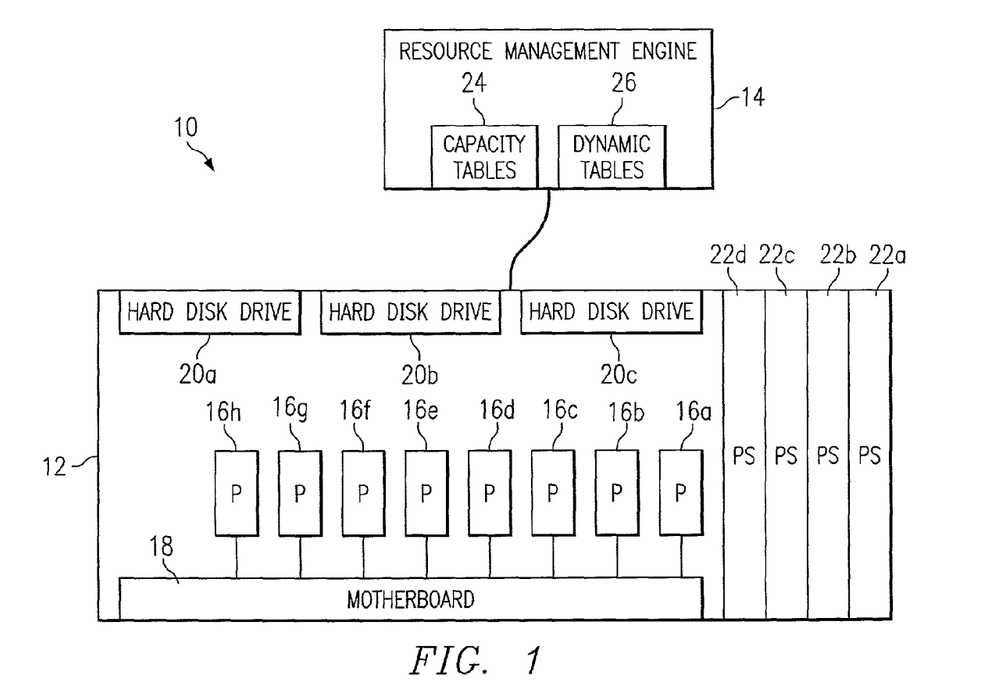
FIG. 1 illustrates a block diagram of a system employing strategic power reduction.

FIG. 1 illustrates a block diagram of system 10 employing strategic power reduction. System 10 includes server 12 and resource management engine 14.

As shown in the embodiment of FIG. 1, server 12 is an 8-way server having eight different processors 16, all coupled to motherboard 18. Processors 16 occupy space on motherboard 18 or in alternative embodiments may be in the form of processor cards, complete with local resources such as caches, memory, and supporting chipsets, that plug into a standard backplane which uses a shared power bus. In alternative embodiments, server 12 may have more than eight processors or less than eight processors.

Processors 16 may be IBM compatible mobile processors, such as are available through Intel and Advanced Micro Devices. Processors 16 may be mobile processors, such as those generally used in laptop computers, instead of the processors generally used in desktop computers or servers because mobile processors often have lower power states in addition to just on and off states like a typical desktop computer or server processor. Using mobile processors instead of desktop computer or server processors allows for strategic power reduction in server 12 because processors 16 may be powered to a lower power state to save energy. In addition, using mobile processors and chipsets in multi-processor servers increases server density within a server rack by reducing power consumption per server, and allows for the opportunity to utilize local and global power management strategies to reduce power consumption and still maintain server capacity. Also, processors 16 may be configured as symmetrical or asymmetrical processors.

In addition to processors 16, server 12 also contains hard disk drives 20. Server 12 in FIG. 1 contains three hard disk drives 20 but in alternative embodiments, server 12 may have more than three or less than three hard disk drives 20. Hard disk drives 20 store data for server 12 and may be SCSI, EIDE, or any other appropriate hard disk drive type.

Associated with server 12 and processors 16 are four power supplies 22. In alternative embodiments, server 12 may contain more than four or less than four power supplies 22. Power supplies 22 are of the appropriate power rating to provide load-balancing. In previous systems and methods, more than one power supply 22 was generally only provided for redundancy. For instance, power supplies 22a, 22b, and 22c would typically supply all of the needed power to operate all eight processors 16, all three hard disk drives 20, and any other components within server 12 requiring power. Therefore, power supply 22d was present only for redundancy and back-up purposes and would generally come online only if there was a problem with power supply 22a, 22b, or 22c. So if power supply 22a went offline or had a malfunction, power supply 22d would come online and operate in place of power supply 22a. But in the present disclosure, in addition to providing redundancy features, the multiple power supplies 22 also allow for strategic power reduction in server 12. In addition, system 10 goes beyond simple redundancy to address the fact that processors 16 within server 12 may be powered down and consequently require even less power supply redundancy.

System 10 allows for strategic power reduction in server 12 through the operation of resource management engine 14. As shown in FIG. 1, resource management engine 14 may be located external to server 12. But in alternative embodiments, resource management engine 14 may be internal to server 12 as a separate unit or stored across hard disk drives 20 and processors 16. When resource management engine 14 is external to server 12, resource management engine 14 communicates with server 12 through communication channel 23 which may be an Ethernet connection or any other appropriate communication network.

Resource management engine 14 provides power reduction and power conservation by determining and controlling which processors 16, hard disk drives 20, and power supplies 22 function within server 12 based upon the demand on server 12. To help in the power reduction, resource management engine 14 stores information in capacity tables 24 and dynamic tables 26. Capacity tables 24 store such information as processor startup and shutdown times, power supply capacities, and performance statistics for the processors and power supplies such as MHz/watt, transactions per minute per sec ("tpmC/sec"), and transactions per minute per watt ("tpmC/watt"). Dynamic tables 26 store historical information to aid in resource management engine 14 forecasting or predicting future demands on server 12. Dynamic tables 26 store, for example, historical demand data from other time periods relating to typical time of day loading, day of week loading, holiday loading, other special and normal event loadings, and knowledge of power grid performance from a power distribution system. In alternate embodiments, dynamic tables 26 store equations instead of data where the equations calculate the future demand taking into account the time of day and the supply information of server 12. In the embodiment shown in FIG. 1, capacity tables 24 and dynamic tables 26 may be located within resource management engine 14. But in other embodiments, capacity tables 24 and dynamic tables 26 are stored across hard disk drives 20 in server 12. To provide redundancy and allow continued operation if resource management engine 14 malfunctions, the information stored in capacity tables 24 and dynamic tables 26 can be stored in both resource management engine 14 and hard disk drives 20.

In order to conserve and reduce power consumption, resource management engine 14 scales processors 16 in response to power and processing demands made upon server 12. Resource management engine 14 scales processors 16 by turning processors 16 on, off, or to a lower power state depending on the demand on server 12. Each processor 16 includes power management hardware coupled to it that allows resource management engine 14 to dynamically operate each processor 16 by turning it on, off, or to a lower power state without disrupting or restarting other currently operating processors 16. In addition, resource management engine 14 may scale processors 16 so that the scaling is invisible to a user and the operating system.

For one embodiment, regardless of demand, processor 16a will always be turned on to provide overhead processing needs such as motherboard and bus requirements. Using information stored in capacity tables 24 regarding processors 16 and power supplies 22, resource management engine 14 determines when additional processors 16 should be brought online, offline, or reduced to a lower power state to efficiently satisfy the demand on server 12. For example, processor 16b may be turned on as the base level at 8:00AM when a typical work day begins where processor 16a provides overhead processing needs. As the work day progresses, the demand on server 12 generally increases. Resource management engine 14 tracks the demand on server 12 and at 10:00AM when demand reaches a certain predetermined level, resource management engine 14 may turn on processor 16c to accommodate the increased demand. At 11:00AM, demand greatly increases so that resource management engine 14 brings online processors 16d and 16e to handle the demand on server 12. At noon, demand on server 12 drops so that resource management engine 14 turns off processor 16e and reduces processor 16d to a lower power state. At 1:00PM, demand may increase and resource management engine 14 returns processor 16d to a full power state. At 2:00PM, demand spikes and resource management engine 14 turns on processors 16e, 16f, and 16g to handle the demand on server 12. This demand level continues until 5:00PM when demand may begin to decrease and resource management engine 14 begins to turn off or reduce lower power states of processors 16 until only processor 16a is operational to provide overhead processing needs.

The above example shows how system 10 conserves and reduces power consumption. From 8:00AM to 10:00AM, processor 16a and processor 16b are turned on. In previous multi-processors servers, processor 16c, if not all the remaining processors 16, are generally brought online at 8:00AM and remain online until the end of the work day. But in system 10, power is saved by turning on, off, and reducing to lower power states processors 16. Therefore, processor 16c is offline from 8:00AM until 10:00AM which results in a power savings of two hours for processor 16c. Processor 16d is offline until 11:00AM and is in a lower power state for one hour. There is a power savings of four hours for processor 16d. Processor 16e does not come online until 11:00AM, goes offline at noon, and comes back online at 2:00PM which results in a power savings of five hours. Processors 16f and 16g are not brought online until 2:00PM which results in a power savings of six hours for each of processor 16f and 16g. In addition to providing power reduction and conservation, the operating life of processors 16 also increases because processors 16 are not constantly operational. The operation of system 10 occurs seamlessly and is transparent to users of server 12 so that the users think that all eight processors 16 are always functioning.

In addition to adjusting to the current demand on server 12, system 10 also forecasts or predicts the demand on server 12 based on historical data allowing server 12 to adjust in advance to meet future processing and power demands. Resource management engine 14 stores in dynamic tables 26 historical data regarding previous demands on server 12 as well as knowledge of power grid performance from a power distribution system. Using this information, resource management engine predicts what the demand on server 12 will be for a given time period. Predicting demand far enough in advance allows load-sharing reconfigurations across processors 16 and power supplies 22.

For instance, assume that server 12 provides functionality for a website providing online stock trading. By examining the historical data in dynamic tables 26, resource management engine 14 determines that there is a spike in demand one hour before the New York stock market closes every day that requires all eight processors 16. To account for this spike in demand, prior to one hour before the stock market closes, resource management engine 14 may bring online all eight processors 16 so that server 12 meets the demand without any lag in performance. Therefore, power consumption is reduced because all eight processors 16 are only powered for one hour of the day instead of all day long. Without being able to scale processors 16, server 12 would have to have all eight processors 16 powered all day just to meet the demand for the last hour of the day.

Resource management engine 14 also predicts demand levels for special events such as sporting events or holidays or just typical day of the week demand. The predictive analysis permits strategically preparing for higher demands by changing processors 16 in advance for optimized access. Another benefit of predictive analysis is that maintenance and downtime work can be scheduled around predicted high demand times.

Predictive analysis also allows server 12 to dynamically adjust to national or global phenomena or events and still reduce and conserve power consumption. Resource management engine 14 uses predictive power demand estimates based upon power demands of geographically dispersed data centers in different time zones that experience similar demands earlier in the day.

For example, assume there are huge losses on the Nikkei in Japan. As this news began to spread to Europe and the United States, respective stock markets react and there is high activity and high demand on any websites offering online stock trading. But predictive analysis can efficiently handle this situation. As news travels around the globe and as each country's stock market opens for trading, there will be huge demands made on servers offering online stock trading. For instance, the London market would open before the New York market, so servers serving the London market would need to be scaled to handle the large demand when the London market opens. Later in the day as the New York market opens, servers serving the New York market would need to be scaled to handle the huge demand and this can be done by examining the demand on the London market and predicting what the demand will be in New York. One hour later when the Chicago markets opens, the same scaling would need to occur using the previous time zone demand as an estimate until all the markets have had time to react to the initial shock in Japan. Predictive analysis on a global scale applies to any global event that affects other parts of the world the world.

Another advantage of system 10 is that it allows for a desired power threshold to be maintained in server 12. The power threshold is achieved by allowing the response time of server 12 to vary between acceptable limits in order to minimize power consumption. Instead of just bringing processors 16 online and offline as fast as possible, resource management engine 14 may have a range of targeted response times for how quickly it brings online and offline processors 16. In addition, resource management engine 14 follows set parameters on whether to power off a processor 16 or reduce it to a lower power state. As demand rises, additional processors 16 are brought online to satisfy the demand. As demand drops, resource management engine 14 powers down processors 16 to lower power states or takes them offline. When power limits are achieved, processors 16 are re-balanced relative to their processing efficiency for such factors as MHz/watt or tpmC/watt and may include their relative power supply efficiencies. As demands rise, the strategy attempts to maximize available processing power while limiting the increase in response time. When demand drops, less efficient processors 16 could be brought online to maximize tpmC/sec.

Figure 2:
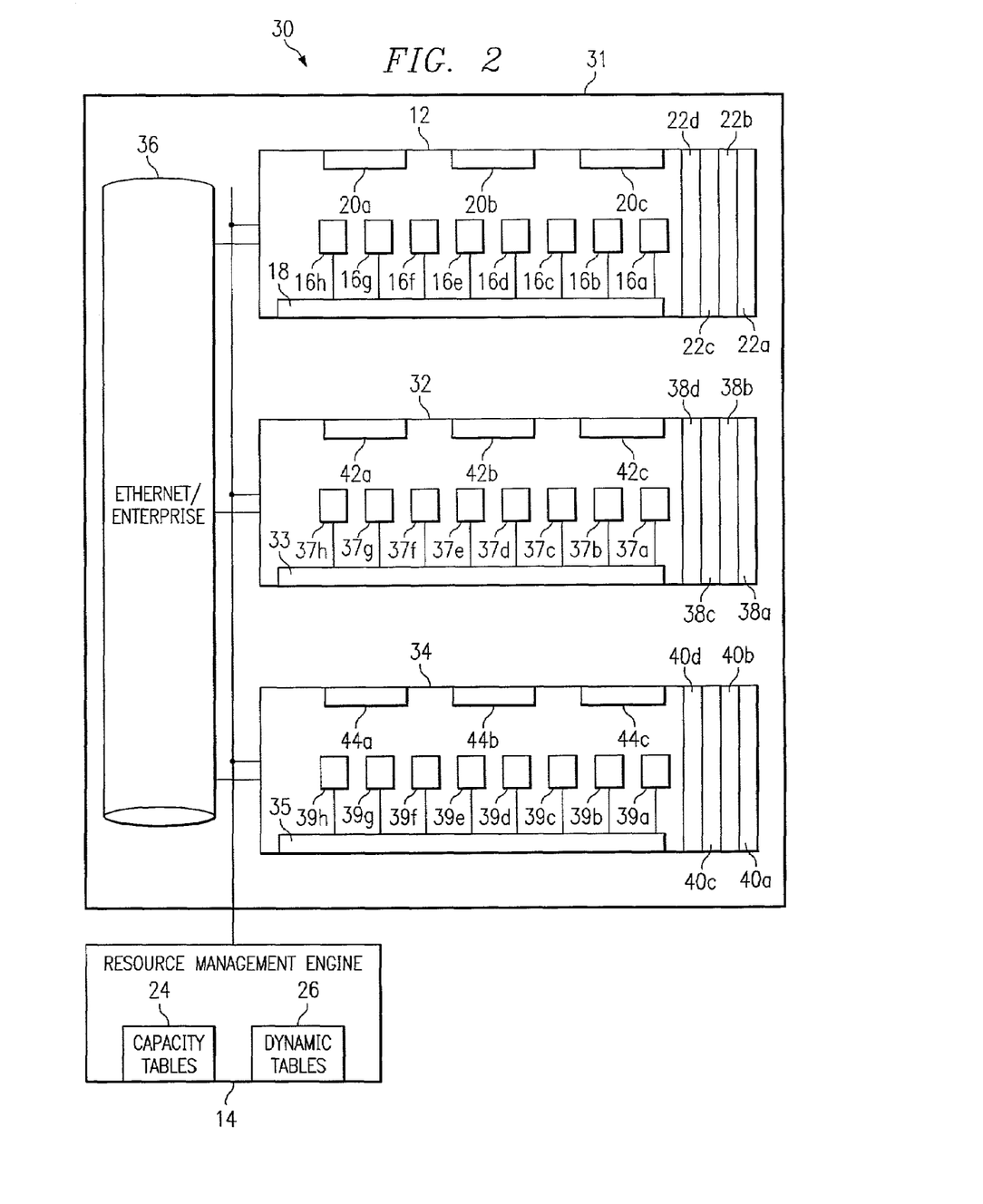
FIG. 2 depicts a block diagram of a server rack system employing strategic power reduction.

Referring to FIG. 2, a block diagram of a server rack system employing strategic power reduction described above is shown. System 30 includes server rack 31 containing servers 12, 32, and 34. In alternative embodiments, system 30 may contain more than three or less than three servers in the server rack. Resource management engine 14 is associated with servers 12, 32, and 34 and provides power reduction and conservation features to servers 12, 32, and 34. Servers 12, 32, and 34 communicate with each other and resource management engine 14 through enterprise channel 36 which may be an Ethernet connection or any other appropriate communication network.

Server 12 is the same server as described in FIG. 1. Servers 32 and 34 are similar to server 12 in that each one is an 8-way server having eight processors 37 and 39, four power supplies 38 and 40, and three hard disk drives 42 and 44. Resource management engine 14 is the same as described in FIG. 1 except that it controls servers 12, 32, and 34 and their respective processors 16, 37, and 39 to achieve power reduction and conservation.

Capacity tables 24 store processor and power supply information for all three servers 12, 32, and 34 while dynamic tables 26 store historical data for previous demands on servers 12, 32, and 34. As with system 10, the information stored in capacity tables 24 and dynamic tables 26 may be stored solely in resource management engine 14, spread out across hard disk drives 20, 42, and 44, or in both locations. Storing information in servers 12, 32, and 34 or in both locations allows for redundancy and continued operation if there is a malfunction with resource management engine 14.

Resource management engine 14 controls servers 12, 32, and 34 just as it controls server 12 in FIG. 1. System 30 allows for an enterprise wide power reduction and conservation strategy. Even though servers 12, 32, and 34 are three separate computing devices, resource management engine 14 controls them as if they are one computing device and they operate as if they are one computing device. Resource management engine 14 preferably has knowledge of relevant characteristics of all components in servers 12, 32, and 34 which allows resource management engine 14 to control servers 12, 32, and 34 as one computing device.

Resource management engine 14 can bring online or offline entire servers 12, 32, or 34 or bring online, offline, or power to a lower power state any of processors 16, 37, or 39. For instance, server 12 can always be turned on as the base server. As demand increases and all eight processors 16 within server 12 cannot meet the demand, resource management engine 14 may turn on server 32 and processors 37 to satisfy the demand requirements. When demand is too great for all eight processors 16 and all eight processor 37, resource management engine 14 may turn on server 34 and processors 39 to satisfy the demand. But all the processors in a certain server do not need to be utilized before a new server is brought online. For example, assume server 12 and processors 16a, 16b, and 16c are turned on. An increase in demand requires additional processors to satisfy the demand. Instead of bringing up additional processors 16, resource management engine 14 can bring up processors 37a and 37b in server 32 to satisfy the demand. One reason for brining up additional processors in server 32 is to evenly distribute the run-time hours of servers 12, 32, and 34. The order in which the processors and servers are brought online and offline is determined by the characteristics of the processors and servers, and user inputs regarding a hierarchy between the processors and servers into resource management engine 14.

As with system 10 operating alone in FIG. 1, system 30 also exhibits predictive analysis, dynamic adjustment to global conditions, and establishing power thresholds as explained above.

Figure 3:
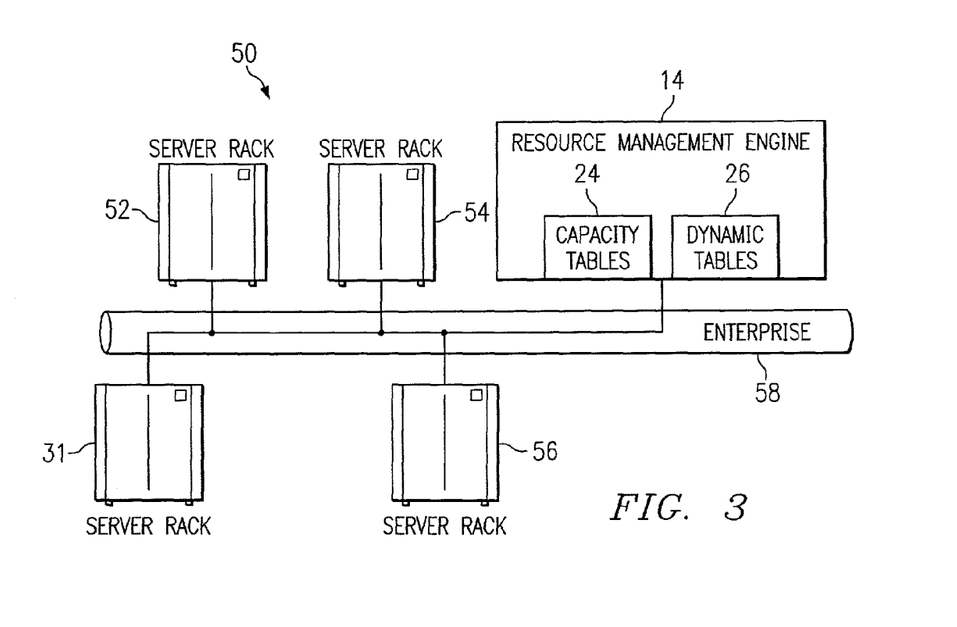
FIG. 3 illustrates a block diagram of a system employing strategic power reduction at the enterprise-level.

FIG. 3 illustrates a block diagram of system 50 employing strategic power reduction at a higher enterprise level or server rack level. System 50 includes server rack 31 from FIG. 2 and resource management engine 14 from FIGS. 1 and 2.

System 50 includes four server racks 31, 52, 54, and 56 as well as resource management engine 14. Server racks 31, 52, 54, and 56 may communicate with each other and resource management engine 14 through enterprise communication network 58 which may be an Ethernet connection or any other appropriate communication network. As with systems 10 and 30, resource management engine 14 contains capacity tables 24 and dynamic tables 26 where the information stored in capacity tables 24 and dynamic tables 26 can be in resource management engine 14, stored across servers 31, 52, 54, and 56, or in all locations for redundancy purposes.

Resource management engine reduces and conserves power consumption by turning on, off, or powering to a lower power state server racks 31, 52, 54, and 56 and the processors within server racks 31, 52, 54, and 56 according to power and processing demands made on system 50. Resource management engine 14 can turn on or off entire server racks 31, 52, 54, and 56, individual processors within servers in server racks 31, 52, 54, and 56, or individual servers within server racks 31, 52, 54, and 56. And as with systems 10 and 30, system 50 employs predictive analysis, dynamic adjustment for global occurrences and power threshold management.

Figure 4:
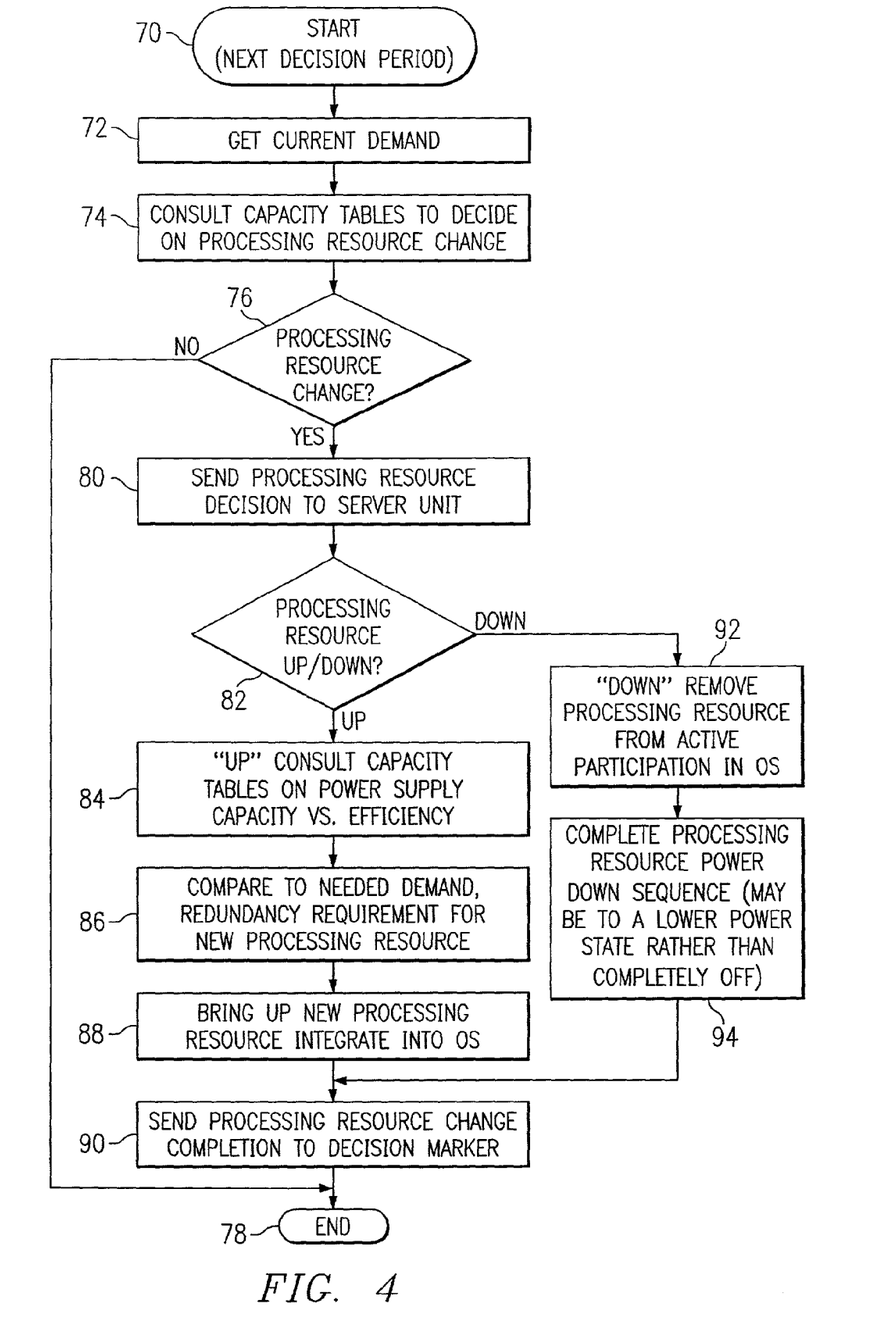
FIG. 4 depicts a flow diagram of a method for strategic power reduction in a computer system.

FIG. 4 shows one example of a flow diagram of a method for strategic power reduction in a computer system. For discussion purposes, FIG. 4 refers to system 10 but equally applies to system 30 and system 50.

The process begins in step 70 when the next decision period begins. In step 72, resource management engine 14 analyzes server 12 to get the current power and processing demands on server 12. Resource management engine 14 then examines capacity tables 24 to decide if a processor change is required to satisfy the current demand in step 74. Resource management engine 14 looks at the processor 16 characteristics in capacity tables 24 and compares those values with the current demand. From the comparison in step 74, resource management engine 14 decides if a processor change is needed to meet the current demand in step 76. If no processor change is required, the process ends in step 78. If a processor change is required, the process continues on to step 80.

In step 80, resource management engine 14 signals to server 12 that a processor change is imminent. Using the current demand, resource management engine 14 determines if the current demand requires bringing online additional processors 16 or bringing offline processors 16 in step 82. If the current demand requires bringing online additional processors 16, the process continues to step 84 while if the current demand requires bringing offline processors 16, the process continues on to step 92.

If the decision is to bring online additional processors 16, in step 84 resource management engine 14 consults capacity tables 24 to examine the power supply requirements of the currently operating processors 16 with the efficiency ratings of processors 16 and power supplies 22 to ensure that bringing online additional processors 16 will not cause for server 12 to operate inefficiently. In step 86, resource management engine compares the current demand requirement with the user decided processor and power supply redundancy requirements and any specific requirements for the new processor 16 about to brought online. In step 88, resource management engine 14 brings up the additional processors 16 needed to meet the current demand and the additional processors 16 are integrated into the operating system for server 12. In step 92, the processor change is complete and a completion decision is sent to both server 12 and resource management engine 14 and the process ends in step 78.

If in step 82 the decision is to reduce the number of processors 16 in order to meet the current demand, in step 92 resource management engine 14 removes the no longer needed processor 16 from active participation in the operating system of server 12. Once processor 16 is removed from active participation, in step 94 resource management engine must decide whether to take processor 16 offline or power it to a lower power state. The decision on whether to take offline or to a lower power state depends on the current demand level, predicted future demand levels, power threshold levels, processor 16 and power supply 22 characteristics, and power management strategies. If resource management engine 14 predicts that the demand requirement will increase again in a short time period, processor 16 may be powered to a lower power state instead of completely taken offline so that when the additional processing power is needed to meet the current demand, processor 16 will only have to go from a lower power state to online instead of from offline to online. This will allow for power conservation and also decreases startup time for the processor. In step 90, the processor change is complete and a completion decision is sent to both server 12 and resource management engine 14 and the process ends in step 76.

The process in FIG. 4 may repeat at selected intervals such as every five or ten minutes so that resource management engine 14 constantly determines the current demand and adjusts system 10 to the current demand so that power consumption is reduced. Resource management engine 14 may adjust the time period of the intervals based on historical data and/or the level of current demand on server 12.

Although the disclosed embodiments have been described in detail, it should be understood that various changes, substitutions and alterations can be made to the embodiments without departing from their spirit and scope.

What is claimed is:

1. A computer system comprising:
   a plurality of processing resources operable to process data;
   one or more power supplies associated with the processing resources, the one or more power supplies operable to supply power to the plurality of processing resources;
   a resource management engine associated with the processing resources the resource management engine comprising at least one dynamic table listing historical demand data for the system;
   the resource management engine operable to:
   predict a decreased demand requirement for the processing resources for a first time period based at least on the historical demand data for the system; and
   in response to the predicted decreased demand requirement, select between (a) lowering the power state of a particular processing resource and (b) turning off the particular processing resource for the first time period based at least on whether the demand requirement is predicted to increase at a second time period subsequent to the first time period.

2. The system of claim 1 wherein the processing resources comprise mobile processors.

3. The system of claim 1 wherein the processing resources comprise hard disk drives.

4. The system of claim 1 wherein the resource management engine scales the number of processing resources in accordance with an enterprise-wide power management strategy.

5. The system of claim 1 wherein the resource management engine scales the number of processing resources by powering up additional processing resources.

6. The system of claim 1 wherein the resource management engine scales the number of processing resources by powering down the processing resources.

7. The system of claim 6 wherein the resource management engine powering down the processing resources comprises powering off the processing resource.

8. The system of claim 6 wherein the resource management engine powering down the processing resources comprises reducing the processing resource to a lower power state.

9. The system of claim 1 further comprising a plurality of capacity tables associated with the resource management engine, the capacity tables operable to store a plurality of information regarding the processing resources and the one or more power supplies.

10. The system of claim 1 further comprising a plurality of dynamic tables associated with the resource management engine, the dynamic tables operable to store a plurality of predictive analysis information.

11. The system of claim 1 wherein the processing resources comprise a plurality of servers.

12. The system of claim 1 wherein the processing resources comprise a plurality of racks containing a plurality of servers.

13. The system of claim 1 further comprising the resource management engine predicting demand requirements.

14. The system of claim 1 further comprising the resource management engine maintaining a power threshold among the processing resources and the one or more power supplies.

15. A method for the optimizing of power consumption by a computer system having a plurality of processing resources and one or more power supplies associated therewith, the method comprising:
receiving a predicted demand requirement for a first time period based on historical demand data for the computer system;
determining if the demand requirement requires a processing resource change;
adjusting the plurality of processing resources to satisfy the demand requirement including, in response to a predicted decreased demand requirement, selecting between (a) lowering the power state of a particular processing resource and (b) turning off the particular processing resource for the first time period based at least on whether the demand requirement is predicted to increase at a second time period subsequent to the first time period.

16. The method of claim 15 wherein determining if the demand requirement requires a processing resource change comprises consulting a plurality of capacity tables.

17. The method of claim 15 wherein determining if the demand requirement requires a processing resource change comprises deciding whether to power up additional processing resources of the one or more power supplies.

18. The method of claim 15 wherein determining if the demand requirement requires a processing resource change comprises deciding whether to power down at least one of the plurality of processing resources.

19. The method of claim 15 wherein adjusting a plurality of processing resources comprises powering down at least one of the plurality of processing resources when the demand requirement decreases.

20. The method of claim 19 wherein powering down processing resources comprises turning off one or more of the plurality of processing resources.

21. The method of claim 19 wherein powering down at least one of the plurality of processing resources comprises powering at least one processing resource to a lower power state.

22. The method of claim 15 wherein adjusting the plurality of processing resources comprises powering up additional processing resources when the demand requirement increases.

23. The method of claim 22 wherein powering up additional processing resources comprises integrating the additional processing resource with the already operating processing resources.

24. The method of claim 15 further comprising:
predicting future demand requirements; and
adjusting the plurality of processing resources to meet the future demand requirements.

25. The method of claim 24 wherein predicting demand requirements comprise consulting a plurality of dynamic tables, the dynamic tables listing historical demand data associated with the computer system.

26. The method of claim 15 further comprising maintaining a power threshold in the plurality of processing resources.

* * * * *